United States Patent
Hull et al.

(10) Patent No.: US 8,015,494 B1
(45) Date of Patent: Sep. 6, 2011

(54) MELDED USER INTERFACES

(75) Inventors: Jonathan J. Hull, San Carlos, CA (US); Peter Hart, Menlo Park, CA (US)

(73) Assignee: Ricoh Co., Ltd., Tokyo (JP)

( * ) Notice: Subject to any disclaimer, the term of this patent is extended or adjusted under 35 U.S.C. 154(b) by 1826 days.

(21) Appl. No.: 09/532,412

(22) Filed: Mar. 22, 2000

(51) Int. Cl.
G06F 3/00 (2006.01)

(52) U.S. Cl. ........ 715/746; 715/745; 715/747; 715/764; 715/765

(58) Field of Classification Search .................. 345/745, 345/746, 747, 764, 765, 767, 768, 769, 790, 345/630, 632, 634; 715/745, 747, 764, 765
See application file for complete search history.

(56) References Cited

U.S. PATENT DOCUMENTS

| | | | | |
|---|---|---|---|---|
| 5,420,978 A | * | 5/1995 | Tozawa et al. | 345/440 |
| 5,577,188 A | * | 11/1996 | Zhu | 345/745 |
| 5,596,702 A | * | 1/1997 | Stucka et al. | 345/746 |
| 5,760,770 A | * | 6/1998 | Bliss et al. | 345/745 |
| 5,767,849 A | * | 6/1998 | Borgendale et al. | 345/745 |
| 5,936,625 A | * | 8/1999 | Kahl et al. | 345/775 |
| 6,195,098 B1 | * | 2/2001 | Brittain et al. | 345/422 |
| 6,392,671 B1 | * | 5/2002 | Glaser | 345/745 |

FOREIGN PATENT DOCUMENTS

| | | |
|---|---|---|
| JP | H06-124183 | 5/1994 |
| JP | H09-101937 | 4/1997 |
| JP | 2002-047991 | 2/2000 |
| WO | WO98/09212 | 3/1998 |

OTHER PUBLICATIONS

R.O. Duda & P.E. Hart, "Pattern Classification & Scene Analysis," Wiley, New York, 1973.
R.O. Duda & P.E. Hart, "Use of the Hough transform to detect lines and curves in pictures," Communications of the ACM, v. 15, No. 1, Jan. 1972, 11-15.
H. Lieberman, "Integrating User Interface Agents with Conventional Applications," International Conference on Intelligent User Interfaces, San Francisco, Jan. 1998.
H. Lieberman, "Grammex: Defining Grammars by Example," ACM Conference on Computer-Humam Interfaces, Apr. 18-23, 1998, 11-12.
Japanese Office Action 2000-380411 mailed Mar. 15, 2008 (3 pages).

* cited by examiner

*Primary Examiner* — Simon Ke
(74) *Attorney, Agent, or Firm* — Blakely, Sokoloff, Taylor & Zafman, LLP

(57) ABSTRACT

In one embodiment, a method for combining the user interfaces of several applications is disclosed. Data generated by a first application is extracted from a display buffer. The data is associated with a user interface from the first application. From the extracted data, a layout pattern is recognized. Using the layout, an overlay is created. The overlay is used to display a second data generated by a second application. There is no direct link between the first application and the second application.

40 Claims, 11 Drawing Sheets

FIG. 2

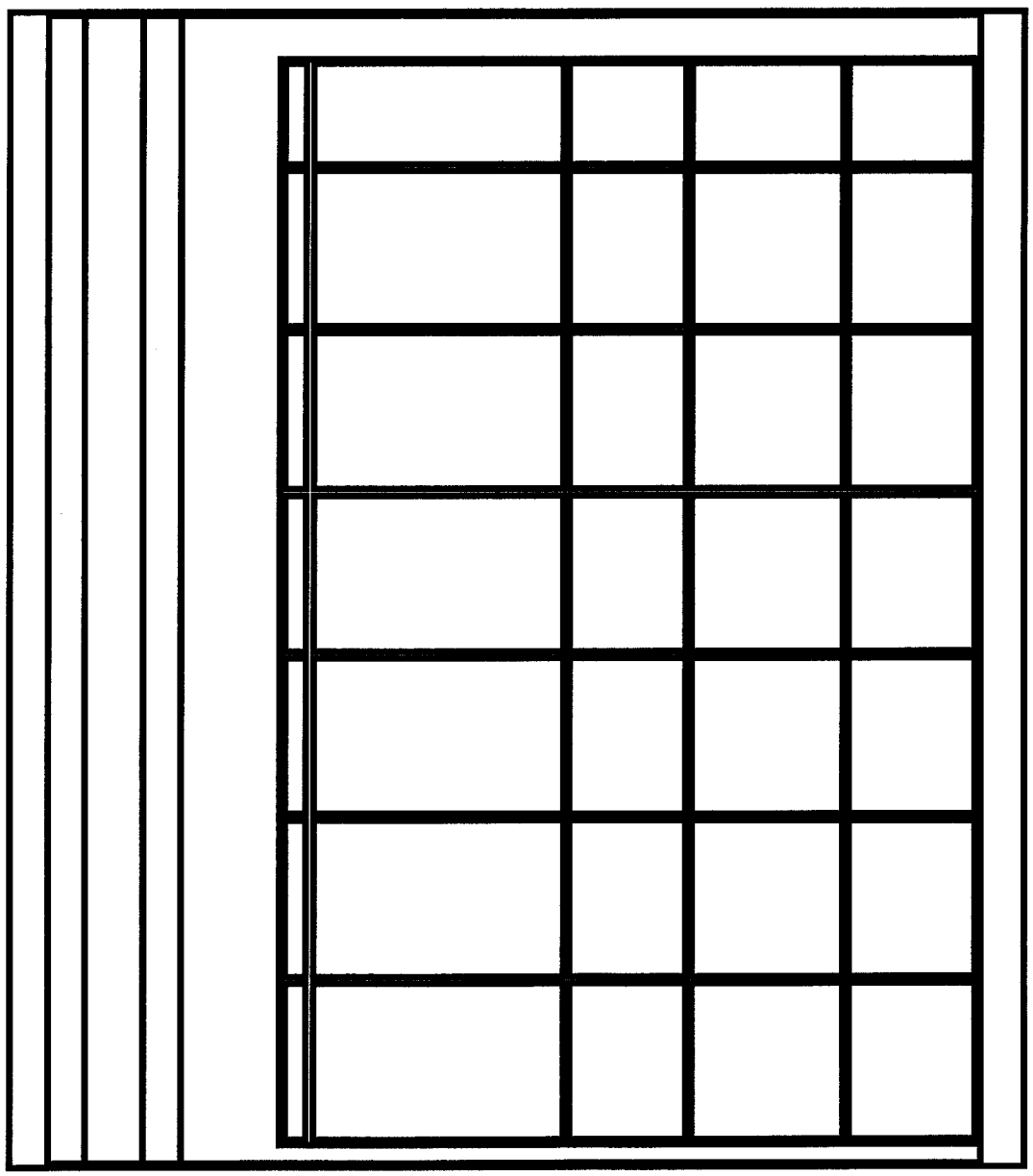

MELDED USER INTERFACES

FIELD OF THE INVENTION

The present invention relates generally to field of user interfaces for computer systems. More specifically, the present invention is directed to a method and an apparatus for combining the user interfaces of a plurality of applications.

BACKGROUND

User interfaces refers to the methods and devices that are used to accommodate interaction between the machines and the users who use them. The user interfaces allow for communicating information from the machine to the user, and communicating information from the user to the machine.

Generally, the user interacts with the machine through the user interfaces presented by an application running on the machine. The user interfaces are designed by the software developers with the purpose of allowing the user to take full advantage of the functions of the applications. This may include presenting a finite number of options for the user to choose rather than requiring the user to memorize and manually enter commands from a large number of command options. Furthermore, the user interfaces are generally designed so that they are intuitive and easy to use. This significantly reduces the training to use a new application allowing the user to become productive in a short time.

Since the user may use applications designed by different groups of software developers from the different software vendors, the user is required to be familiar with multiple user interfaces and to interact with each interface individually. This requirement still exists even though there may be overlapping interfaces among the applications.

Unless there are collaborations among the software vendors, the user interfaces for each application are designed virtually without any anticipation of being modified by applications from other software vendors. This is because the software vendors want to preserve the carefully designed graphics and layout of their user interfaces. As a result, the user is unable to take advantage of the common user interfaces and data structure among the applications.

SUMMARY OF THE INVENTION

In one embodiment, a method for combining the user interfaces of several applications is disclosed. Data generated by a first application is extracted from a display buffer. The data is associated with a user interface from the first application. From the extracted data, a layout pattern is recognized. Using the layout, an overlay is created. The overlay is used to display a second data generated by a second application. There is no direct link between the first application and the second application.

BRIEF DESCRIPTION OF THE DRAWINGS

The present invention is illustrated by way of example in the following drawings in which like references indicate similar elements. The following drawings disclose various embodiments of the present invention for purposes of illustration only and are not intended to limit the scope of the invention.

FIG. 2 is an exemplary web-based calendar manager illustrating a parent application.

FIG. 4A is an exemplary layout with the boundaries identified.

FIG. 5A illustrates the exemplary calendar parent application with the overlay information from the child application.

FIG. 5B illustrates an exemplary interaction with the child application.

DETAILED DESCRIPTION

Figure 1A:
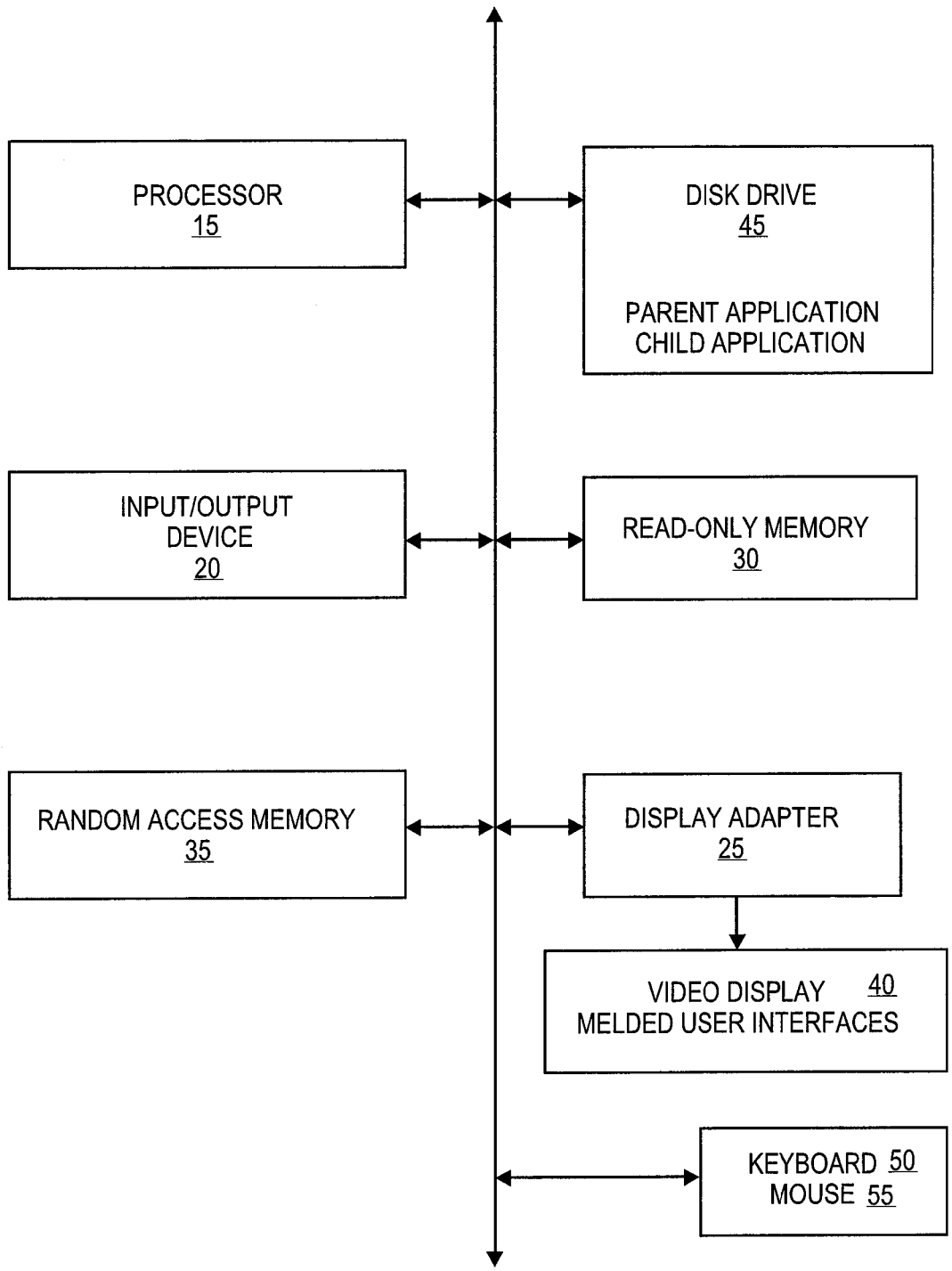
FIG. 1A illustrates one embodiment of a computer system.

A method and apparatus for combining the user interfaces of several applications are disclosed. In the following description, for purposes of explanation, specific nomenclature is set forth to provide a thorough understanding of the present invention. However, it will be apparent to one skilled in the art that these specific details are not required in order to practice the present invention.

Some portions of the detailed descriptions that follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention also relates to apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, and magneto-optical disks, read-only memories (ROMs), random access memories (RAMs), EPROMs, EEPROMs, magnetic or optical cards, or any type of media suitable for storing electronic instructions, and each coupled to a computer system bus.

The algorithms and displays presented herein are not inherently related to any particular computer or other apparatus. Various general-purpose systems may be used with programs in accordance with the teachings herein, or it may prove convenient to construct more specialized apparatus to perform the required method steps. The required structure for a variety of these systems will appear from the description below. In addition, the present invention is not described with reference to any particular programming language. It will be appreciated that a variety of programming languages may be used to implement the teachings of the invention as described herein.

Overview

There is a need for a capability to allow the user interfaces of two or more applications to be combined or merged with one another. This capability allows for the free exchange of information between related applications and allows the context of a user interface from one application to be used by many different applications.

A method and apparatus for melding user interfaces are described. Melded user interfaces combines the user interfaces of two or more applications and does not require the cooperation or acquiescence from the applications (or their programmers). Using melded user interfaces, the screen layout (e.g., base layout) corresponding to the user interface of one application may be used by one or more other applications to display data associated with that application.

The application having the base layout is referred to herein as a parent application. The application whose data modifies the base layout of the parent application is referred to herein as a child application. There may be one or more children applications. The parent application provides the context for the displaying of the data from the children applications.

In one embodiment, an overlay generation mechanism (e.g., application) retrieves raster data associated with the user interface of the parent application from the display buffer of a personal computer video card. The raster data is used to determine a layout so that the child application can overlay the data it wants to display. In one embodiment, in order to make the correct overlay, previously compiled information about the layout of the user interface of the parent application is utilized. For example, when the parent application is an appointment application displaying appointment information in a monthly calendar view, the information that can be compiled from the display includes data such as, for example, the location of the month name, the locations of the day names, the locations of the day numbers, etc. It will be appreciated to note that the parent application's user interface is designed and provided by the software vendor, independent of any child application. This independence of the parent application from the child application is advantageous because it allows a wide range of children applications to be used with the parent application.

FIG. 1A is exemplary embodiment of a personal computer system that may be used to perform functionality described herein. The various components shown in FIG. 1A are provided by way of example. Certain components of the computer in FIG. 1A can be deleted from the addressing system for a particular implementation of the invention. The computer shown in FIG. 1A may be any type of computer including a general-purpose computer.

FIG. 1A illustrates a system bus 10 to which various components are coupled. A processor 15 performs the processing tasks required by the computer. Processor 15 may be any type of processing device capable of implementing the steps necessary to perform the operations discussed above. An input/output (I/O) device 20 is coupled to bus 10 and provides a mechanism for communicating with other devices coupled to the computer. A graphics display adapter 25 is connected to the bus to receive display data generated by the processor 15 and store the display data in a display buffer. A read-only memory (ROM) 30 and a random access memory (RAM) 35 are coupled to bus 10 and provide a storage mechanism for various data and information used by the computer, such as, for example, the overlay generation code and the pattern recognition code. Although ROM 30 and RAM 35 are shown coupled to bus 10, in alternate embodiments, ROM 30 and RAM 35 are coupled directly to processor 15 or coupled to a dedicated memory bus (not shown).

A video display 40 is coupled to the graphics display adapter 25 and displays various information and data stored in the display buffer to the user of the computer. The data display may include the base layout of the parent application by itself or with the overlay display from the child application. A disk drive 45 is coupled to bus 10 and provides for the long-term mass storage of information. Disk drive 45 may be used to store the parent application, the child application, and the overlay generation application. It may also be used to store data associated with the parent and the child application. A keyboard 50 and a mouse 55 are provided to receive input from the user.

Initially, the parent application is the active application that controls the information displayed on the video display 40 before the child application is activated. In one embodiment, the child application runs in the background and is activated by pressing a key or a key combination on the PC keyboard 50. It will be apparent to one skilled in the art that other methods can be used to activate the child application, such as, for example, positioning the pointer of the mouse 55 on an icon representing the child application and pressing the left mouse button. When the child application is activated, the display buffer is read, the pattern recognition operation is applied, and the overlay layout is generated. The user can then interact with the data from the child application in the context of the user interface of the parent application.

In one embodiment, the child application continuously applies pattern recognition operations to the contents of the display buffer. When it detects the presence of a display format indicative of a known parent application, an indication of this event such as, for example, a beep or a flashing icon, is displayed to the user. This indication can be parameterized by the amount of data the child can display in the current context of the parent. The user can then choose to invoke the child application in the manner described above. In another embodiment, the child application may be invoked automatically after a defined period of inactivity by the user.

Figure 1B:
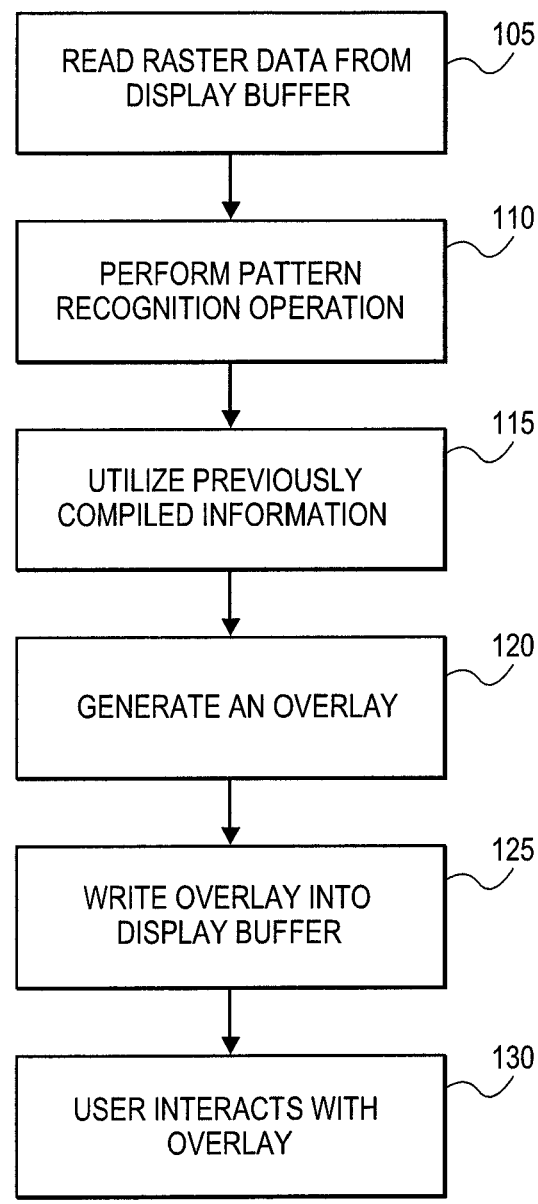
FIG. 1B is an exemplary flow diagram of one embodiment of the melded user interfaces.

FIG. 1B is a flow diagram illustrating an exemplary embodiment of the present invention. At block 105, the raster data is read from the PC graphics card. The raster data is analyzed by a pattern recognition operation, as shown in block 110. The pattern recognition operation looks for patterns in the raster data to identify all or portions of a layout. In one embodiment, information previously compiled about the user interface of the parent application is utilized to identify and locate different sections of the layout, as shown in block 115. For example, when using a calendar display as the display from the parent application, the information about the calendar may comprise of the format of the calendar, the locations of the day names and the locations of the day numbers on the calendar. As another example, the display from the parent application is the window file system layout, and the information about the window file system may comprise the format of the file tree, the locations of the icons representing the directories, etc.

The layout and the previously compiled information about the corresponding user interface are used by the overlay generation mechanism (e.g., application) to generate an overlay layout, as shown in block 120. In one embodiment, the overlay may comprise information from both the parent application and the child application. At block 125, the overlay is written into the display buffer and presented to the user through a display monitor.

At block 130, the user is able to interact with the child application through the melded user interface generated using the overlay. Using the layout of the parent application to display the data from the child application provides the impression that both the parent application and the child application are integrated with one another. In one embodiment, the user of the parent application does not have to learn a new user interface to interact with the child application.

In one embodiment, when the child application is invoked, it writes data into the display buffer. The child application knows where (e.g., x, y pixel location) in the display buffer each data item was written. It also sets an event mask in the operating system that intercepts events from the user interface devices (e.g., keyboard, mouse, etc.). Such events typically include an identification of the event (e.g., identity of the key pressed, mouse button clicked, or x-y cursor position).

Based on a combination of event identity, its x-y location, and the locations of the child's data items, the event is either processed by the child application or it is processed by the operating system as it would normally be if the child application were not present. This allows the user to select the data displayed by the child application. For example, the user can move the mouse cursor on top of data items that were written in the display buffer by the child and click a mouse button to display another data item.

Figure 2:
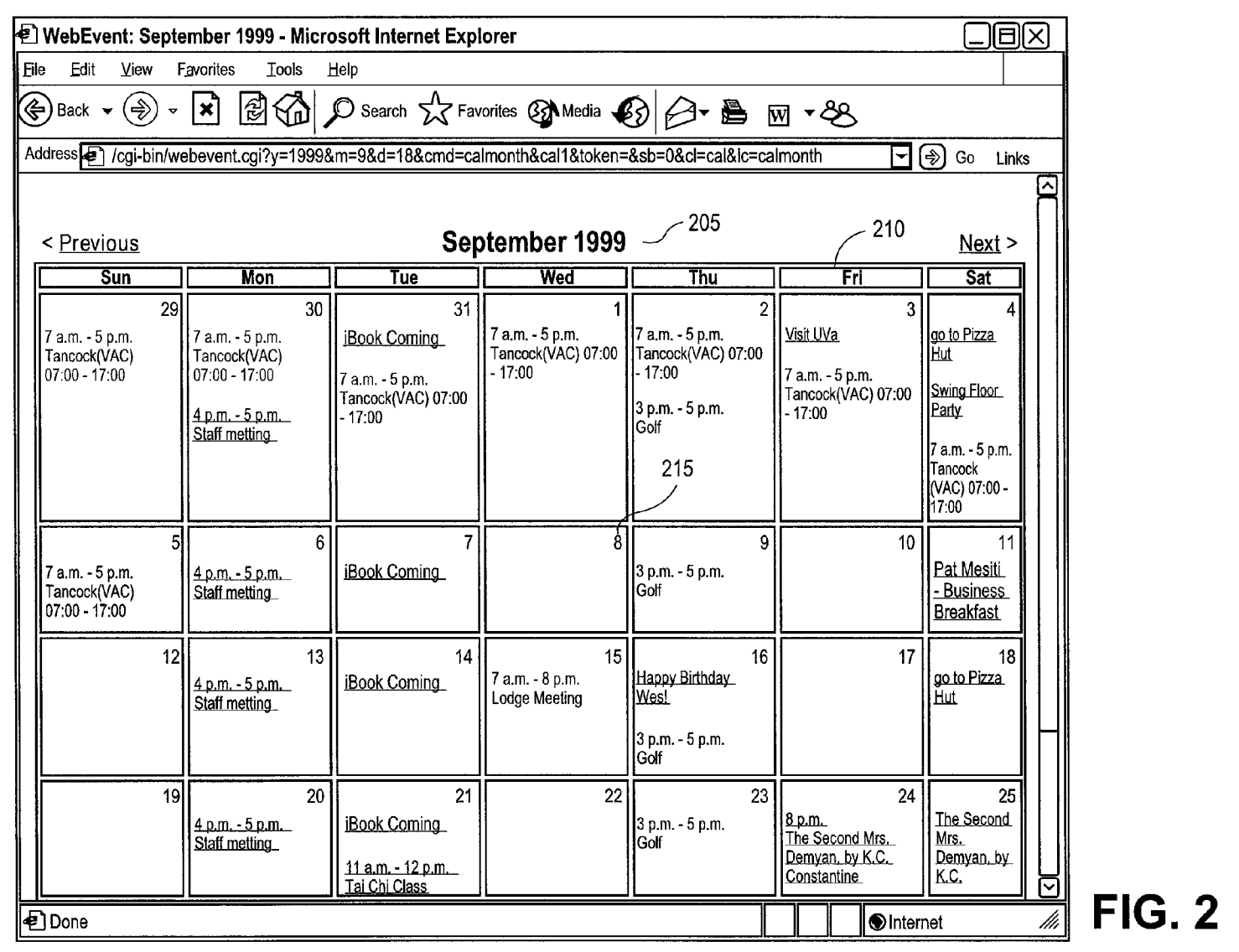

FIG. 2 is an exemplary calendar display that can be used with the present invention. The calendar display is from a web calendar manager which runs as the parent application. Information about the layout of the calendar display includes the knowledge that the calendar manager runs from within a web browser, and the calendar manager typically displays monthly calendar views, characterized by a rectangular grid layout with one grid cell used for each day of a month. Furthermore the month and year are displayed along the top center area 205, the names of the days are displayed in the first row 210, centered above a calendar grid cell, and the day number of each day is displayed in the upper right corner 215 of each grid cell.

Using the knowledge about the parent application, the overlay generation application can generate its overlay on the layout of the parent application without altering the user interface of the parent application or causing the user to learn a new user interface.

In the calendar display example, the display from the calendar manager can be integrated with information from a child application, such as, for example, a document manager application. The document manager application retrieves documents previously generated and saved in a storage device. The overlay generation mechanism (e.g., application) uses the precompiled knowledge about the calendar manager (e.g., parent application) and generates an overlay for the documents retrieved by the document manager (e.g., child application) in the context of the parent application. For example, all documents to be reviewed by the user on Sep. 15, 1999 are shown on the calendar display within the grid identifying the date Sep. 15, 1999.

Figure 3A:
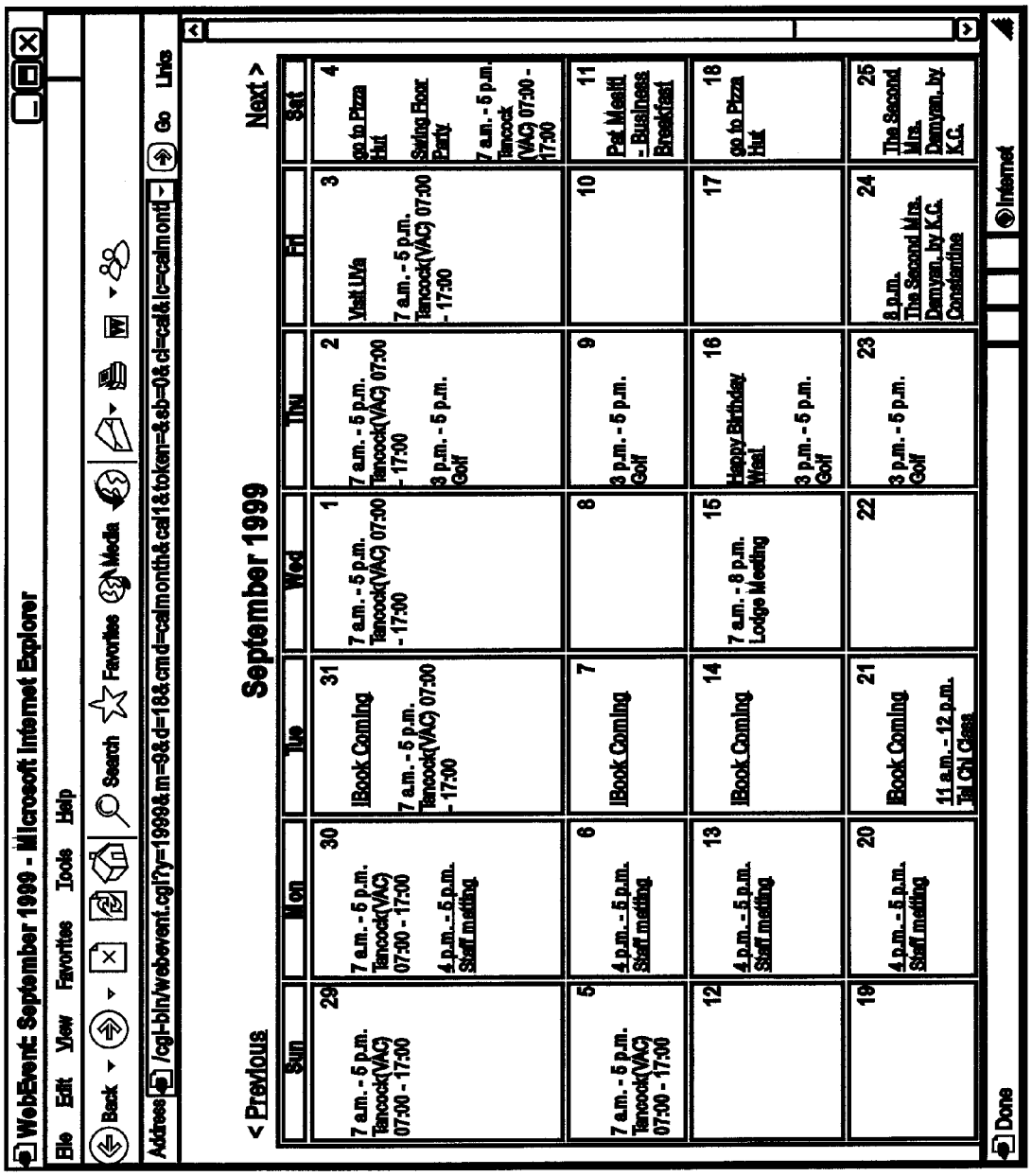
FIG. 3A is an exemplary layout of the calendar produced by an edge detection operation of a pattern recognition application.

The pattern recognition operation detects whether the display buffer contains data representing a monthly calendar view. It finds out where the calendar is on the display and calculates the coordinates of the grid cell for each day. From the coordinates of the grid cells, a grid layout of the entire calendar can be generated. The pattern recognition operation is performed with a series of standard computer vision or image processing operation, which includes an edge detection operation. FIG. 3A is an exemplary layout result produced by the edge detection operation. Note that the highlighted edges correspond to the edges shown in FIG. 2. It will be apparent to one skilled in the art that other pattern recognition operations can be used to generate the grid layout without deviating from the invention.

Figure 3B:
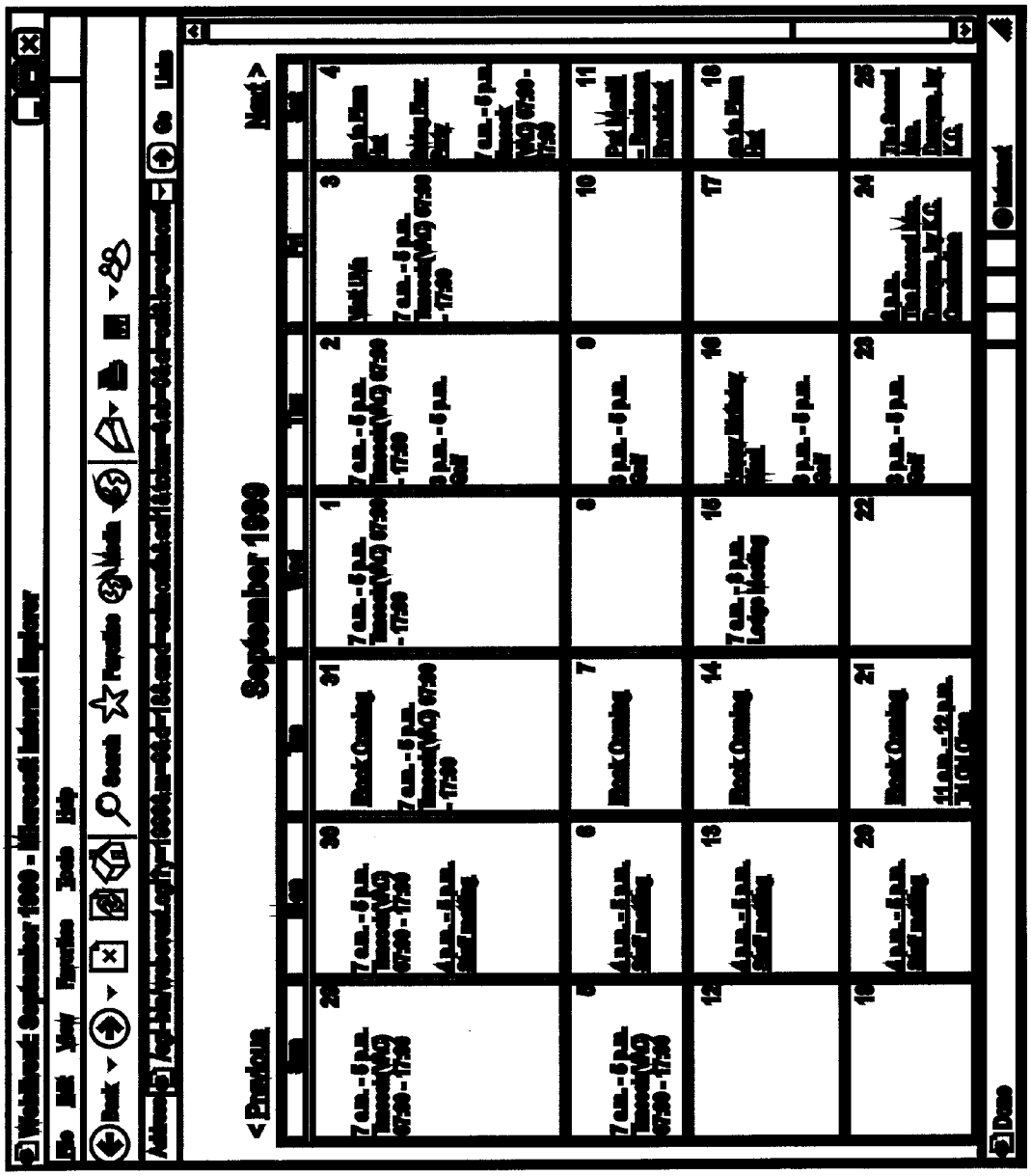
FIG. 3B is an exemplary layout produced by an edge smoothing operation.
Figure 4B:
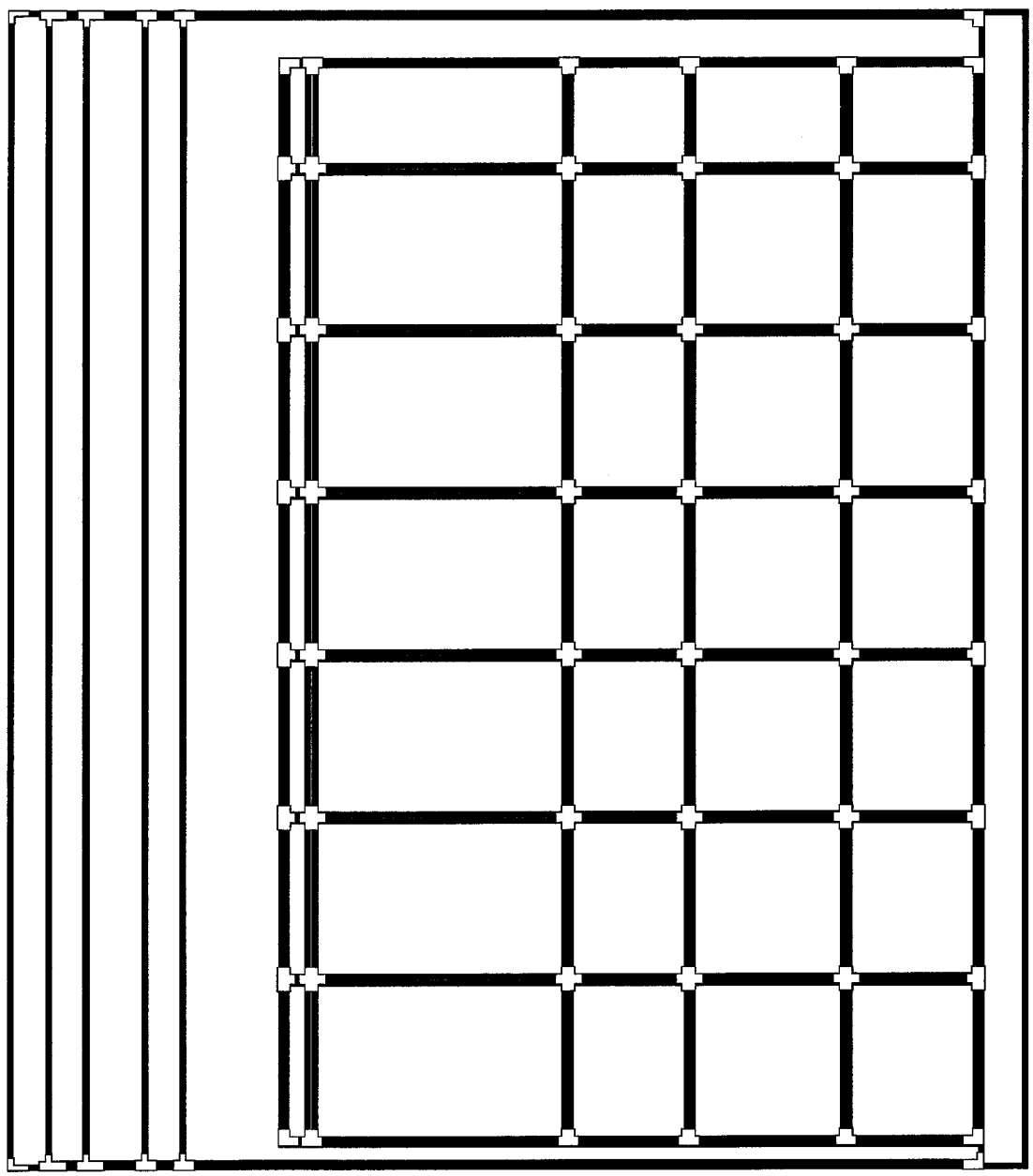
FIG. 4B is the same layout as in FIG. 4A with the corners and intersections identified.

The edges of the layout result shown in FIG. 3A are filtered through a smoothing operation. This smoothing operation groups the pixels and connects the lines together. FIG. 3B is an exemplary result produced by the smoothing operation. A line detection algorithm is then applied to locate the boundaries of the grid cells, as shown in FIG. 4A. The line intersections and corners are identified using standard techniques, as shown in FIG. 4B. This provides the grid for the calendar display.

Figure 4C:
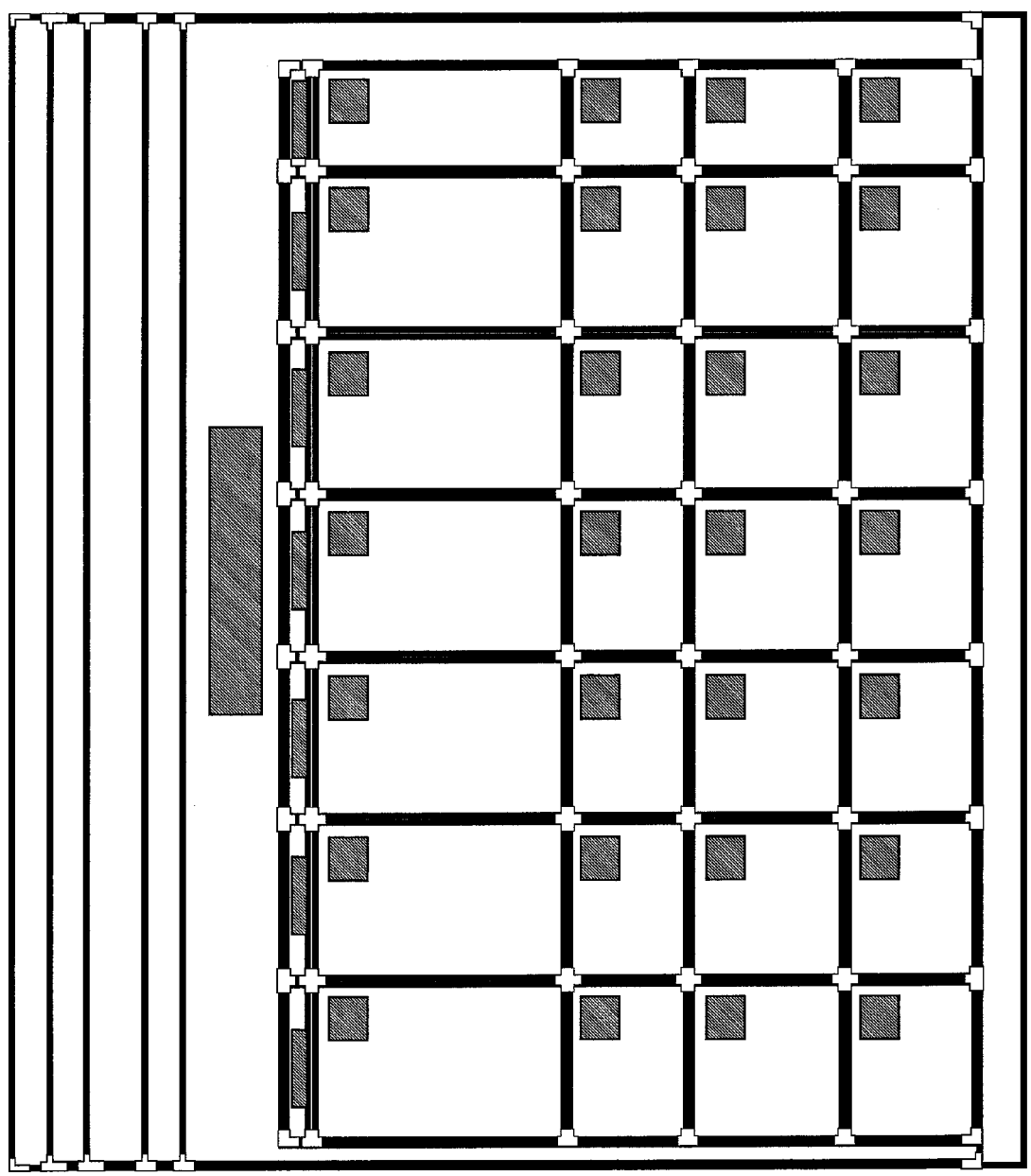
FIG. 4C is the same layout as in FIG. 4B with the addition of the information previously compiled about the calendar.

The precompiled information about the calendar display is then used to estimate the locations of the day number, the day names, the months, and the year information in the grid of the calendar, as shown in FIG. 4C. In one embodiment, optical character recognition (OCR) is applied to the raster data in these locations to obtain the day number, the month and the year displayed in the calendar. Contextual post-processing using knowledge about the calendar is applied to verify the character recognition results.

Figure 5A:
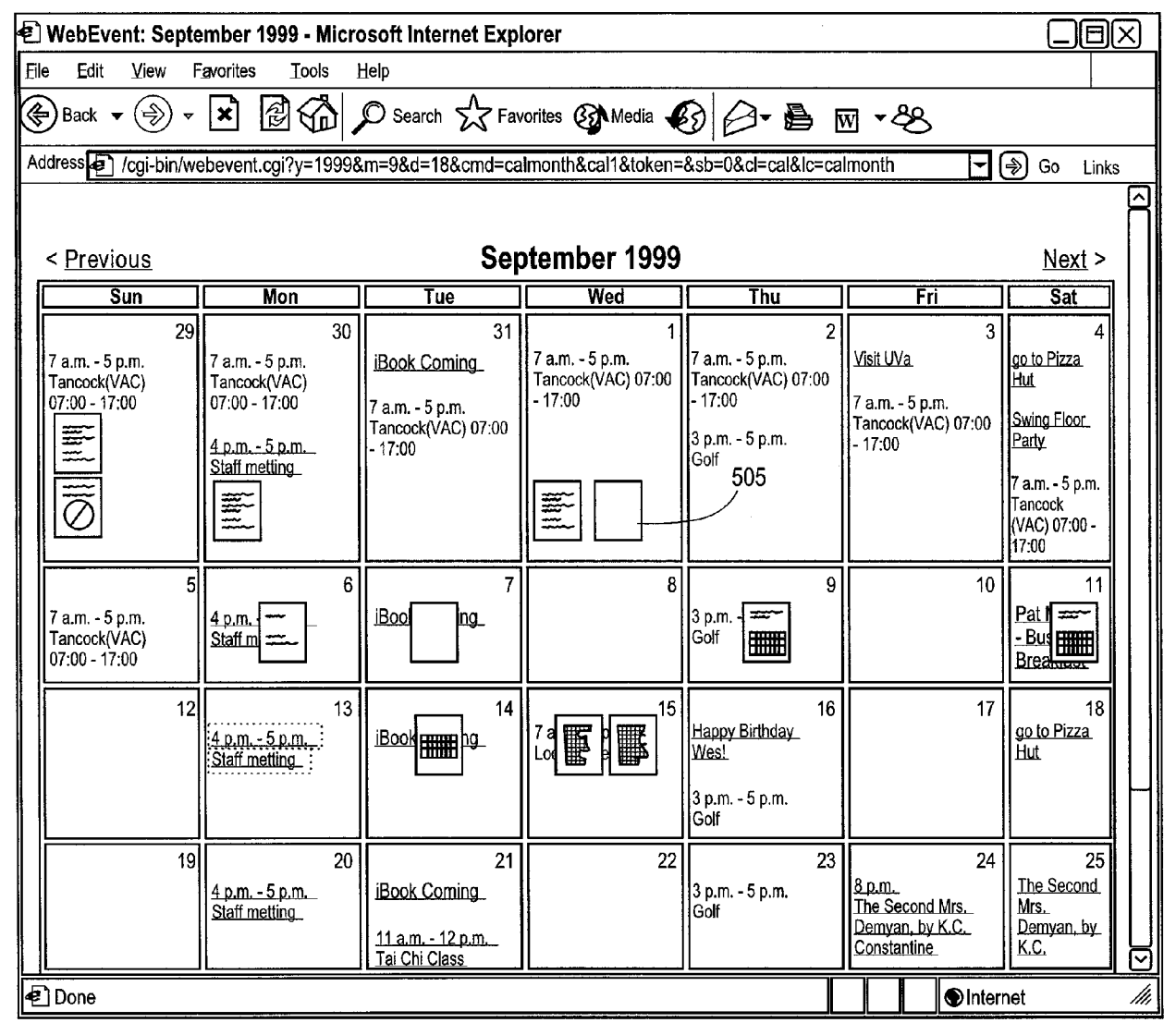

The overlay generation application uses the grid information and the knowledge about the locations of the day number, the day and the month to generate the overlay corresponding to the lay out of the parent application. FIG. 5A illustrates an exemplary calendar parent application with the overlay information from the child application. In one embodiment, the document manager (i.e., child application) uses icons or thumbnail images to represent the documents. The physical location on the screen where the thumbnail images are placed is determined based on the grid cell locations and dates that were found by the pattern recognition operation. The document thumbnail images 505 are then included in the overlay and displayed in the melded user interface.

In one embodiment, the user may dynamically adjust the size of the icons. In another embodiment, the overlay generation operation extracts the first few pages of the documents and displays them in the melded user interface. Alternatively, the title or some other information indicative of the documents may be displayed instead of the thumbnail images or icons.

The overlay generation mechanism (e.g., application) may have to determine the locations of the data displayed by the parent application so that the placements of the thumbnail images from the child application do not overlap with the data from the parent application. In one embodiment, the overlay generation application may display the document thumbnail images on top of the data displayed by the parent application. The user may invoke the overlay mode by pressing a function key on the PC keyboard. This triggers the execution of the child application and displays the thumbnail images on the calendar.

Figure 5B:
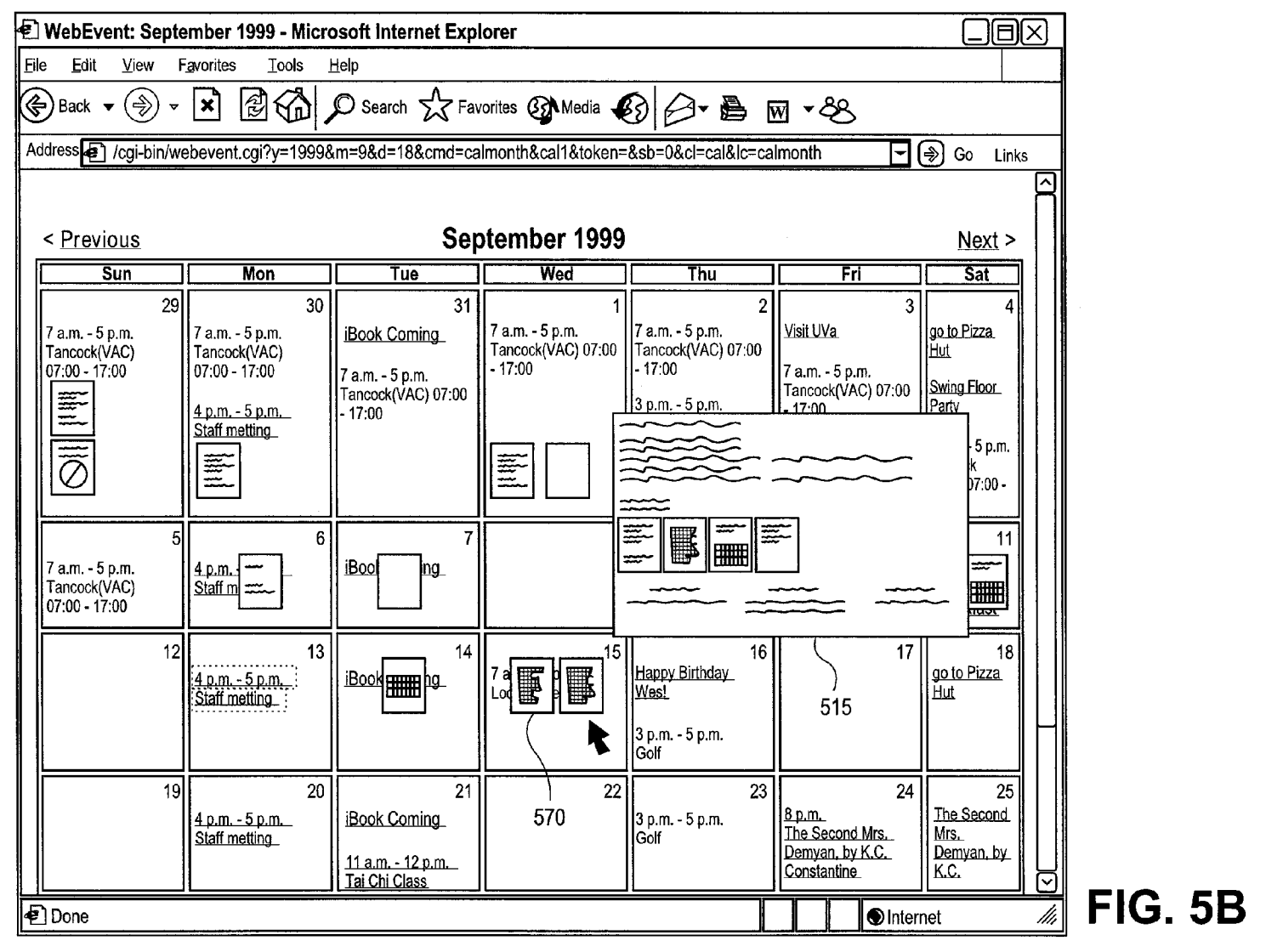

FIG. 5B illustrates an exemplary interaction with the child application though the melded user interfaces. Through the melded user interface, the user interacts with the child application by selecting the thumbnail images. Clicking on the thumbnail images 510 navigates the user to higher resolution documents represented by the thumbnail images. In one embodiment, the icons are also hotlinked to complete document descriptions 515 so that when the user places the cursor over the icon the complete description is displayed.

In one embodiment, the thumbnail images displayed in a grid cell show one or more documents that were recorded on that date. The display of the parent application and the child application can be toggled from one to the other. When the display from the child application is toggled on, the information from the parent application may be suppressed or overlapped by the information from the child application.

Also, when the display from the child application is toggled on, the child application has control of the interaction between the user and the system. On the other hand, when the display from the parent application is toggled on, the information from the parent application reappears and the parent application has control of the interaction between the user and the system.

When the document thumbnail image is selected, the document is retrieved by the child application. The child intercepts the "selection," as previously described and retrieves the document based on the event type. For example, clicking on the left mouse button could retrieve (from a document server), a high resolution image of the document depicted in the thumbnail. The child maintains a table of network addresses (e.g., URL's) that correspond to each thumbnail and event type. Those network addresses are accessed and their contents retrieved when the particular event is executed.

Alternatively, the document can be retrieved by another application outside of the child application. The document may be retrieved from a document server through a network connection. In one embodiment, when there are multiple documents to be displayed in the same grid cell, only the first few pages of the document are shown as representative pages. An indicator such as, for example, a green bar or a number is used to indicate to the user that the document has additional pages to be seen. This enables the user to go and look further.

In another embodiment, the text displayed by the parent application can be used to initiate a document retrieval request to the document manager. For example, when an appointment in the calendar display is a birth day appointment, the child application may retrieve all documents related to people having birth days on that particular date.

In another embodiment, the user interface can depend on the information provided by operating system. For example, with the web calendar as the parent application running in a browser, the child application may analyze the uniform resource locations (URL) associated with the web calendar application. The URL may provide information that lets the child application know about the type of calendar view being displayed (e.g., week grid, month grid) without having to use the OCR. In another embodiment, both of the information from the registry and the OCR results may be used.

In the foregoing discussion, the document manager application is used to illustrate a child application overlaying the display of the calendar display parent application. Other children applications can also be used to take advantage of the present invention. For example, trip information, airline reservation information, and hotel confirmation information can be generated in the overlay by the overlay generation application using the display buffer. It will be apparent to one skilled in the art that other applications can also be used as the parent application.

Figure 6:
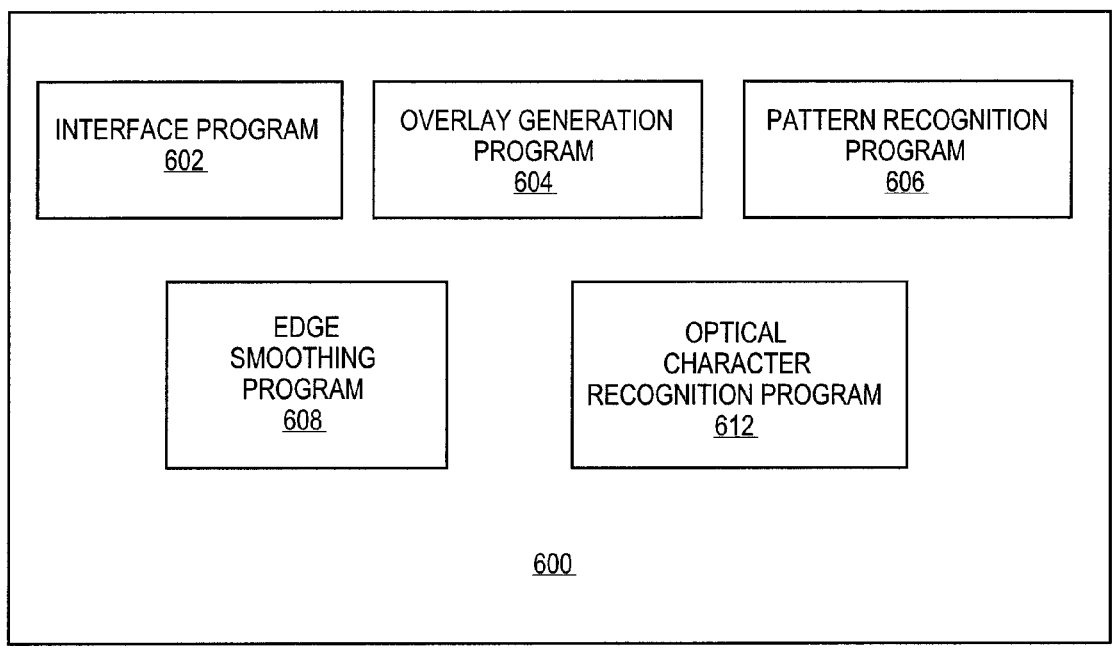
FIG. 6 illustrates one embodiment of a computer-readable medium containing various sets of instructions, code sequences, configuration information, and other data used by a computer or other processing device.

FIG. 6 illustrates an embodiment of a computer-readable medium 600 containing various sets of instructions, code sequences, configuration information, and other data used by a computer or other processing device. The embodiment illustrated in FIG. 6 is suitable for use with the melded user interface method described above. The various information stored on medium 600 is used to perform various data processing operations. Computer-readable medium 600 is also referred to as a processor-readable medium. Computer-readable medium 600 can be any type of magnetic, optical, or electrical storage medium including a diskette, magnetic tape, CD-ROM, memory device, or other storage medium.

Computer-readable medium 600 includes interface code 602 that controls the flow of information between various devices or components in the computer system. Interface code 602 may control the transfer of information within a device (e.g., between the processor and a memory device), or between an input/output port and a storage device. Additionally, interface code 602 may control the transfer of information from one device to another.

Computer-readable medium 600 also includes the overlay generation application 604 that is used to generate the overlay. Other codes stored on the computer-readable medium 600 may include the pattern recognition code 606, the edge smoothing code 608, and the optical character recognition code 612.

From the above description and drawings, it will be understood by those of ordinary skill in the art that the particular embodiments shown and described are for purposes of illustration only and are not intended to limit the scope of the invention. Those of ordinary skill in the art will recognize that the invention may be embodied in other specific forms without departing from its spirit or essential characteristics. References to details of particular embodiments are not intended to limit the scope of the claims.

What is claimed is:

1. A method comprising:
   extracting a first data from a display buffer, the first data being generated by a first application and being associated with a user interface from the first application;
   recognizing a layout from the first data; and
   using the layout to create an overlay to display a second data generated by a second application, wherein there is no direct link between the first application and the second application, and wherein the first data is extracted from the display buffer without cooperation of the first application at runtime.

2. The method of claim 1, wherein recognizing the layout comprises performing a pattern recognition operation on the first data to create the layout.

3. The method of claim 1, wherein using the layout to create the overlay comprises:
   determining an overlay location on the layout to place the second data based on known information about the layout;
   generating the overlay of the layout;
   placing the second data in the overlay; and
   merging the overlay with the layout.

4. The method of claim 3, wherein the overlay location has a context consistent with the second data.

5. The method of claim 4, wherein the context is provided by the first application, and wherein a user interacts with the second application using the context.

6. The method of claim 1, further comprising:
    writing the overlay in the display buffer such that the second data is displayed at the overlay location without changing sections of the first data outside of the overlay location;
    displaying information in the display buffer; and
    interacting with the second application through the second data at the overlay location.

7. The method of claim 6, further comprising running the first application in the background while interacting with the second application.

8. The method of claim 1, wherein the first application runs independently from the second application.

9. A machine-readable storage medium providing instructions, which when executed by a set of one or more processors, cause said set of processors to perform the following:
    extracting a first data from a display buffer, the first data being generated by a first application and being associated with a user interface from the first application;
    recognizing a layout from the first data; and
    using the layout to create an overlay to display a second data generated by a second application, wherein there is no direct link between the first application and the second application, and wherein the first data is extracted from the display buffer without cooperation of the first application at runtime.

10. The machine-readable storage medium of claim 9, wherein recognizing the layout comprises performing a pattern recognition operation on the first data to create the layout.

11. The machine-readable storage medium of claim 9, wherein using the layout to create the overlay comprises:
    determining an overlay location on the layout to place the second data based on known information about the layout;
    generating the overlay of the layout;
    placing the second data in the overlay; and
    merging the overlay with the layout.

12. The machine-readable storage medium of claim 11, wherein the overlay location has a context consistent with the second data.

13. The machine-readable storage medium of claim 12, wherein the context is provided by the first application, and wherein a user interacts with the second application using the context.

14. The machine-readable storage medium of claim 9, further comprising:
    writing the overlay in the display buffer such that the second data is displayed at the overlay location without changing sections of the first data outside of the overlay location;
    displaying information in the display buffer; and
    interacting with the second application through the second data at the overlay location.

15. The machine-readable storage medium of claim 14, further comprising running the first application in the background while interacting with the second application.

16. The machine-readable storage medium of claim 9, wherein the first application runs independently from the second application.

17. A computer system, comprising:
    a bus;
    a data storage device coupled to the bus; and
    a processor coupled to the data storage device, the processor operable to receive instructions which, when executed by the processor, cause the processor to perform a method comprising:
        extracting a first data from a display buffer, the first data being generated by a first application and being associated with a user interface from the first application;
        recognizing a layout from the first data; and
        using the layout to create an overlay to display a second data generated by a second application, wherein there is no direct link between the first application and the second application, and wherein the first data is extracted from the display buffer without cooperation of the first application at runtime.

18. The system of claim 17, wherein recognizing the layout comprises performing a pattern recognition operation on the first data to create the layout.

19. The system of claim 17, wherein using the layout to create the overlay comprises:
    determining an overlay location on the layout to place the second data based on known information about the layout;
    generating the overlay of the layout;
    placing the second data in the overlay; and
    merging the overlay with the layout.

20. The system of claim 19, wherein the overlay location has a context consistent with the second data.

21. The system of claim 20, wherein the context is provided by the first application, and wherein a user interacts with the second application using the context.

22. The system of claim 17, further comprising:
    writing the overlay in the display buffer such that the second data is displayed at the overlay location without changing sections of the first data outside of the overlay location;
    displaying information in the display buffer; and
    interacting with the second application through the second data at the overlay location.

23. The system of claim 22, further comprising running the first application in the background while interacting with the second application.

24. The system of claim 17, wherein the first application runs independently from the second application.

25. A method, comprising:
    modifying data in a display buffer that is generated by a first application with data generated by a second application without cooperation of the first application at runtime, the first application running independently from the second application; and
    receiving input in response to user interactions with the second application through a user interface associated with the data generated by the first application, wherein the data generated by the second application is placed in a location in the user interface, wherein the location is contextually consistent with the data generated by the second application.

26. The method of claim 25, wherein modifying data in the display buffer comprises:
    performing a pattern recognition operation on the data generated by the first application to create a layout; and
    forming an overlay with the layout and with predetermined information about a display corresponding to the user interface, the overlay used to determine placement of the data generated by the second application in the display.

27. The method of claim 26, wherein the layout comprises of grid cells corresponding to display areas in the user interface, and wherein the data generated by the second application is placed in the grid cells.

28. The method of claim 25, wherein the first application runs in the background while the user interacts with the second application.

29. A machine-readable storage medium providing instructions, which when executed by a set of one or more processors, cause said set of processors to perform the following:

modifying data in a display buffer that is generated by a first application with data generated by a second application without cooperation of the first application at runtime, the first application running independently from the second application; and receiving input in response to user interactions with the second application through a user interface associated with the data generated by the first application, wherein the data generated by the second application is placed in a location in the user interface, wherein the location is contextually consistent with the data generated by the second application.

30. The machine-readable storage medium of claim 29, wherein modifying data in the display buffer comprises:

performing a pattern recognition operation on the data generated by the first application to create a layout; and forming an overlay with the layout and with predetermined information about a display corresponding to the user interface, the overlay used to determine placement of the data generated by the second application in the display.

31. The machine-readable storage medium of claim 30, wherein the layout comprises of grid cells corresponding to display areas in the user interface, and wherein the data generated by the second application is placed in the grid cells.

32. The machine-readable storage medium of claim 29, wherein the first application runs in the background while the user interacts with the second application.

33. A computer system, comprising:

a bus;

a data storage device coupled to the bus; and a processor coupled to the data storage device, the processor operable to receive instructions which, when executed by the processor, cause the processor to perform a method comprising:

modifying data in a display buffer that is generated by a first application with data generated by a second application without cooperation of the first application at runtime, the first application running independently from the second application; and receiving input in response to user interactions with the second application through a user interface associated with the data generated by the first application, wherein the data generated by the second application is placed in a location in the user interface, wherein the location is contextually consistent with the data generated by the second application.

34. The computer system of claim 33, wherein modifying data in the display buffer comprises:

performing a pattern recognition operation on the data generated by the first application to create a layout; and forming an overlay with the layout and with predetermined information about a display corresponding to the user interface, the overlay used to determine placement of the data generated by the second application in the display.

35. The computer system of claim 34, wherein the layout comprises of grid cells corresponding to display areas in the user interface, and wherein the data generated by the second application is placed in the grid cells.

36. The computer system of claim 33, wherein the first application runs in the background while the user interacts with the second application.

37. A method comprising:

reading raster data from a raster display buffer containing an image generated by a first application without cooperation of the first application at runtime;

performing a pattern recognition on the image to generate a pattern;

applying predetermined information about the image with the pattern to determine a layout of the image;

generating an overlay using the layout of the image; and placing data generated by a second application on the overlay.

38. The method of claim 37, further comprising writing the overlay into the raster display buffer.

39. The method of claim 37, wherein the image comprises a user interface from the first application, and wherein a user interacts with the second application through the user interface while the first application runs in the background.

40. The method of claim 39, wherein while the user interacts with the second application, the first application has no control of input received from the user.

* * * * *